Nov. 2, 1926.  
W. F. THOMPSON  
AUTOMOBILE GATE  
Filed July 9, 1925
1,605,485
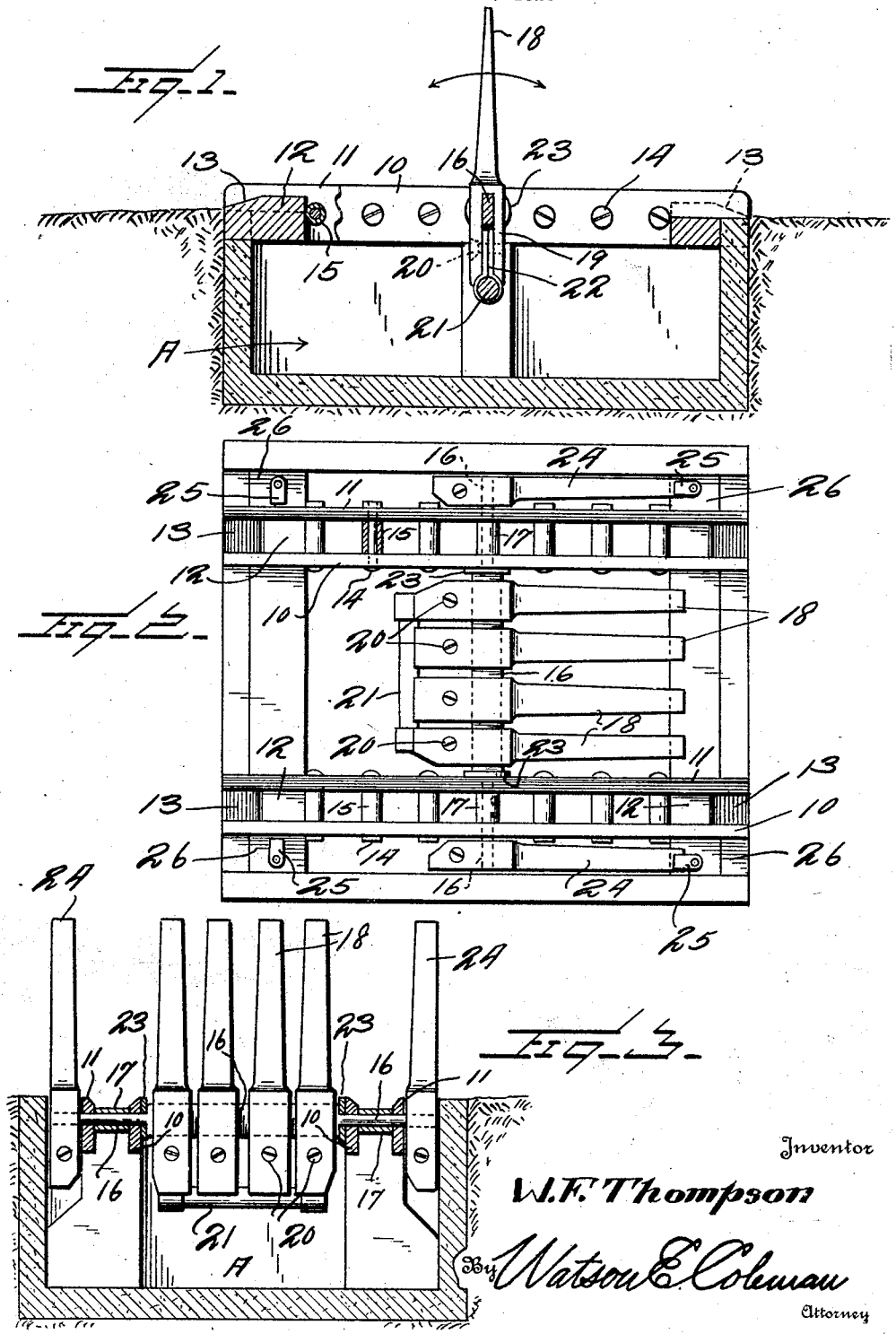
Inventor  
W. F. Thompson  
By Watson E. Coleman  
Attorney Patented Nov. 2, 1926.

1,605,485

UNITED STATES PATENT OFFICE.

WILLIAM F. THOMPSON, OF KENTON, OKLAHOMA.

AUTOMOBILE GATE.

Application filed July 9, 1925. Serial No. 42,546.

This invention relates to gates, and the general object of the invention is to provide a device which will permit the passage of an automobile or like vehicle but which will prevent the passage of stock.

A further object is to provide a device of this character comprising a gate which is pivoted and weighted so that it normally stands upright but which will swing down into a horizontal position when struck by an automobile to permit the passage of the automobile, the weights being of sufficient heaviness as to prevent the gate being pushed over by animals.

A still further object is to provide a device of this character having means whereby the gate may be locked in its lowered position.

Other objects will appear in the course of the following description.

My invention is illustrated in the accompanying drawing, wherein:—

Figure 1 is a longitudinal sectional view through an automobile gate constructed in accordance with my invention;

Figure 2 is a top plan view of the construction shown in Figure 1 but with the gate proper turned into a horizontal position and latched;

Figure 3 is a transverse section through the pit and gate structure;

Referring to this drawing, A designates a pit. Extending across this pit are rails comprising the two lateral members 10 and 11, 11 being the outer member connected at its ends by a spacer 12, the upper face of the spacer being downwardly inclined, as at 13. Connecting these members 10 and 11 are a plurality of bolts 14 carrying sleeves 15 so that these rails permit the passage of the wheels of an automobile. The rails are of sufficient width to accommodate cars having different distances between the wheels. The ends of the rails may be supported in any suitable manner, as may the middle of the rails.

The gate proper consists of a transversely extending shaft 16 which is circular where it passes through bearings 17 mounted between the members 10 and 11 but which may be rectangular in cross section between the rails. Mounted upon this shaft to rotate therewith are a plurality of slats 18, these slats being cleft at their lower ends, as at 19, to fit over the rectangular portions and being held to the shaft by means of screws, or bolts or other means 20.

Carried by these slats in any suitable manner is a relatively heavy weight 21. This is shown as being formed at its ends with lugs 22 which extend up into the clefts 19 of the two end slats arranged between the rails. Washers 23 are disposed between the end slats and the faces of the inside rails 10. The shaft 16 extends through the two rails and beyond the member 11 and has attached to it the end slats 24 which also extend upward. Normally the gate extends in a vertical position and when an automobile drives upon the tracks and moves onward, the fenders of the car or other parts will strike the gate and tip it over into a horizontal or approximately horizontal position and the car may proceed. The same is true of a car going in the opposite direction. If it is desired to latch the gate in a lowered position so it will not form any obstruction the gate is secured in its lowered position by the latches 25 mounted upon the end walls 26.

Obviously the pit A will form an impediment to the passage of cattle and particularly with the upstanding gate. If the pit alone where used, cattle might pass over the tracks. While I have illustrated a pit which has a length approximately twice the height of the slats, I do not wish to be limited to this as a shorter pit might be used in connection with the gate.

I claim:—

1. A gate of the character described comprising a pit, and longitudinally extending tracks extending over the pit resting at their ends upon the forward and rear walls of the pit but spaced from the bottom thereof and from the lateral walls of the pit, each track consisting of two laterally disposed spaced members, transversely extending rollers mounted between the members and spaced from each other, a shaft passing through both tracks to the exterior thereof, sleeves loosely surrounding said shaft where it passes through said members, slats mounted upon the shaft between the tracks and upon the extremities of the shaft beyond the tracks, and a weight operatively supported by the shaft and urging the slats yieldingly to a vertical position.

2. In a gate of the character described, a pit, longitudinally extending tracks extending over the pit resting at their ends upon the forward and rear walls of the pit and spaced from the lateral walls of the pit, and each track consisting of two laterally disposed spaced members, transversely extending rollers mounted between the members and spaced from each other, a shaft passing through both tracks to the exterior thereof, sleeves loosely surrounding said shaft where it passes through said members, slats mounted upon the shaft between the tracks and upon the extremities of the shaft beyond the tracks, a weight operatively supported by the shaft and yieldingly urging the slats to a vertical position, members adjacent each end of the pit upon which the slats will strike when laid in a horizontal position, and latches carried upon said members and adapted to engage a slat to hold the slats in a horizontal position.

3. A gate of the character described comprising a pit, walls at the ends of the pit, tracks extending across the pit and resting at their ends upon the forward and rear walls of the pit and spaced from the lateral walls thereof, each track comprising two parallel members, filling blocks disposed between the ends of the members and having downwardly inclined faces, connections extending between the members and holding them in spaced relation, said connection being spaced from each other, a pivotal gate mounted part between and part exterior of the tracks, and a weight for yieldingly holding said gate in a vertical position.

4. A gate for automobiles comprising a pit, two parallel longitudinally extending tracks engaging the forward and rear walls of the pit but spaced from the bottom thereof, a transversely extending shaft disposed midway of the tracks and mounted for oscillation therein, the shaft between the tracks being rectangular in cross section, slats mounted upon said shaft, each of said slats being longitudinally slotted upward from its lower end to receive and fit over the rectangular portion of the shaft, means engaging the slotted portions of each slat and causing the slat to bind upon the shaft, and a weight carried by certain of the slats and yieldingly holding the slats in a raised position.

5. A gate for automobiles comprising a pit, two parallel longitudinally extending tracks engaging the forward and rear walls of the pit but spaced from the bottom thereof, a transversely extending shaft disposed midway of the tracks and mounted for oscillation therein, the shaft between the tracks being rectangular in cross section, slats mounted upon said shaft, each of said slats being longitudinally slotted upward from its lower end to receive and fit over the rectangular portion of the shaft, means engaging the slotted portions of each slat and causing the slat to bind upon the shaft, a weight extending beneath a plurality of said slats and normally disposed beneath the shaft and in line therewith, and means for supporting the weight including members embracing the weight and having portions extending upward within the slot of the supporting slats, the means for clamping the slats upon the shaft engaging said weight supporting members and holding them in place.

In testimony whereof I hereunto affix my signature.

WILLIAM F. THOMPSON.